US012469985B2

(12) United States Patent
Johnson et al.

(10) Patent No.: US 12,469,985 B2
(45) Date of Patent: Nov. 11, 2025

(54) ADDITIVELY MANUFACTURED ANTENNA WITH VIVALDI ELEMENT

(71) Applicant: BAE SYSTEMS Information and Electronic Systems Integration Inc., Nashua, NH (US)

(72) Inventors: Alexander D. Johnson, Waltham, MA (US); James F. Fung, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 179 days.

(21) Appl. No.: 18/451,393

(22) Filed: Aug. 17, 2023

(65) Prior Publication Data

US 2025/0062544 A1 Feb. 20, 2025

(51) Int. Cl.
*H01Q 21/22* (2006.01)
*H01Q 5/47* (2015.01)

(52) U.S. Cl.
CPC ............... *H01Q 21/22* (2013.01); *H01Q 5/47* (2015.01)

(58) Field of Classification Search
USPC .......................................................... 343/702
See application file for complete search history.

(56) References Cited

U.S. PATENT DOCUMENTS

| | | | | |
|---|---|---|---|---|
| 3,181,094 | A * | 4/1965 | Hotine | H01P 7/04 333/263 |
| 2019/0260131 | A1* | 8/2019 | Cohen | H01Q 21/064 |
| 2021/0376463 | A1* | 12/2021 | Massman | H01Q 5/25 |

OTHER PUBLICATIONS

Rafiee, M., Granier, F., & Therriault, D. (2021). Advances in coaxial additive manufacturing and applications. Advanced Materials Technologies, 6(11), 2100356. https://doi.org/10.1002/admt.202100356 (Year: 2021).*

Radiall High Frequency connectors catalog. (2021) (Year: 2021).*

* cited by examiner

*Primary Examiner* — Dimary S Lopez Cruz
*Assistant Examiner* — Brandon Sean Woods
(74) *Attorney, Agent, or Firm* — Gary McFaline

(57) ABSTRACT

An antenna assembly includes a first flare arm, a second flare arm located adjacent to the first flare arm, a feed block having an opening therein, a feed slot extending from the opening to an outer periphery of the feed block, and a feed line integral with the feed block as a contiguous unitary component. The first flare arm and the second flare arm are symmetric about the feed block. The feed line can have a first portion integrated into the feed block and a second portion at least partially extending across the feed slot. A method of fabricating an antenna assembly includes additively manufacturing a feed block having a feed slot adjacent to a first flare arm and a second flare arm, and additively manufacturing a feed line having a first portion integral with the feed block, and a second portion at least partially extending across the feed slot.

19 Claims, 9 Drawing Sheets

ADDITIVELY MANUFACTURED ANTENNA WITH VIVALDI ELEMENT

FIELD OF DISCLOSURE

The present disclosure relates to antennas, and more particularly, to an additively manufactured antenna with a Vivaldi element.

BACKGROUND

Generally, an antenna transduces electromagnetic (EM) waves to radio frequency (RF) electrical signals. A Vivaldi antenna is a type of planar antenna that produces a signal via a pair of symmetrically opposing radiating elements forming a ground plane with tapered edges, and a signal feed in a slot, or gap, between the radiating elements. Exciting the ground plane with a current via the signal feed causes EM waves to radiate from the slot. The radiation pattern is a function of the shape and size of the slot relative to the ground plane. However, there remain a number of non-trivial challenges with respect to designing and manufacturing Vivaldi antenna structures.

Figure 1:
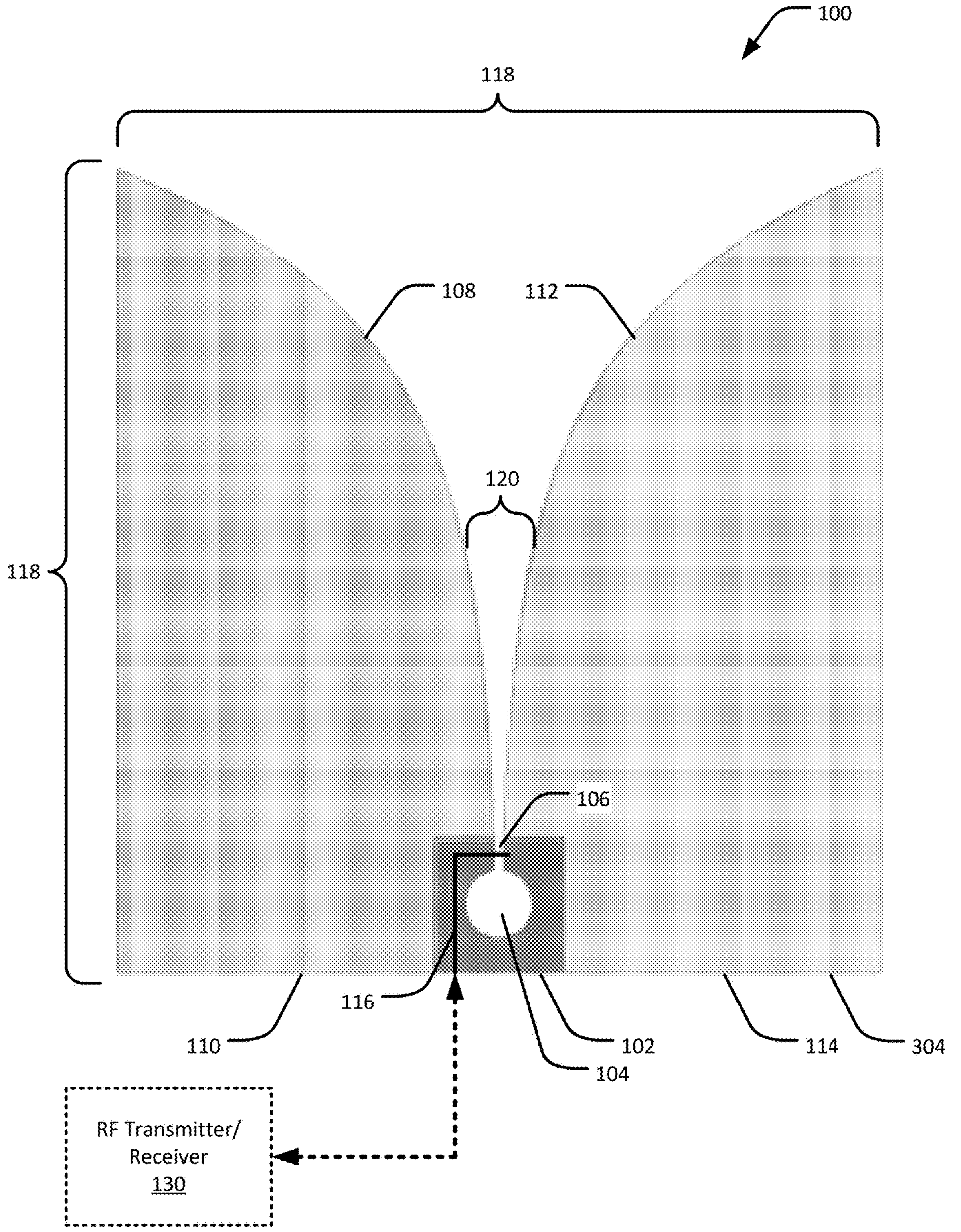
FIG. 1 is a side view of an antenna with a feed block and a Vivaldi element, in accordance with an example of the present disclosure.

Although the following detailed description will proceed with reference being made to illustrative examples, many alternatives, modifications, and variations thereof will be apparent in light of this disclosure.

DETAILED DESCRIPTION

In accordance with an example of the present disclosure, an antenna assembly includes a first flare arm, a second flare arm located adjacent to the first flare arm, a feed block having an opening therein, a feed slot extending from the opening to an outer periphery of the feed block, and a feed line integral with the feed block as a contiguous unitary component. The first flare arm and the second flare arm are symmetric about the feed block. The feed line can have a first portion integral with the feed block, and a second portion at least partially extending across the feed slot. The first flare arm, the second flare arm, the feed block, and/or the feed line can be fabricated using an additively manufacturing process, such as by printing, layering, or otherwise depositing material successively to form the respective component of the antenna assembly, as opposed to subtractive manufacturing, where material is removed or otherwise modified using kinetic energy to form the desired structure.

In accordance with another example of the present disclosure, a method of fabricating an antenna assembly includes additively manufacturing a feed block having a feed slot adjacent to a first flare arm and a second flare arm, and additively manufacturing a feed line having a first portion integral with the feed block as a contiguous unitary component, and a second portion at least partially extending across the feed slot. Numerous configurations and variations will be apparent in light of this disclosure.

Overview

As noted above, a Vivaldi antenna is a type of tapered slot antenna where a radiation pattern is a function of the size and shape of the tapered slot. Some existing Vivaldi antennas are fabricated from a sheet of metal that creates a ground plane, with a slot or other opening located between two opposing tapered edges. A single-ended feed line, such as provided via a coaxial transmission line, is used to excite the ground plane, causing an RF signal to radiate outwardly from the slot. A characteristic of a Vivaldi antenna is an ultra-wideband signal, which is useful for radio applications such as radar or other high frequency applications. Another characteristic is that the size and shape of the antenna can be adjusted to accommodate different frequency ranges.

However, Vivaldi antennas constructed using simple materials, such as thin sheet metals, may have limited thermal management properties, thus requiring additional cooling or heat dissipation techniques to be employed for high power applications. Furthermore, existing Vivaldi antenna fabrication techniques are not well-suited for packaging active electronics into the antenna using low loss interconnects. Therefore, there remain a number of non-trivial challenges with respect to designing and manufacturing Vivaldi antenna structures.

Accordingly, techniques are described to fabricate a Vivaldi antenna using an additive manufacturing process. In an example, a Vivaldi element fabricated according to the disclosed techniques is a wideband directional antenna that can be used in a variety of RF applications, such as direction finding, communications, and electronic warfare (EW). The antenna, or portions thereof, can be additively manufactured. Examples of such an additive manufacturing process include where one or more components of the antenna are fabricated by the successive addition of material, such as using three-dimensional printing, layering, or other deposition process. By using an additive manufacturing process, the antenna design can (i) be wavelength scaled (e.g., scaled linearly as a function of frequency); (ii) handle high power; and (iii) provide dual functions as an RF and a mechanical structure for packaging electronics. For example, the structure of the antenna can be load bearing and/or can host one or more thermal management features, such as direct liquid cooling channels or convection cooling fins. Furthermore, additive manufacturing facilitates production of antennas with high precision and little variation, while easily allowing for design variants to achieve various performance requirements with little to no additional engineering development costs.

In some examples, the antenna can be additively manufactured as a single contiguous piece (a unitary or monolithic structure), or as a combination of additively manufactured and metal machined components, which can improve performance for lower frequency antennas. For example, at least some portions of the antenna structure can be fabricated by additively adding materials selected to improve thermal performance and to integrate impedance matched components into a contiguous unitary structure or substructure. By constructing all or portions of the antenna using additive manufacturing, the antenna can thus be configured to handle very high power (e.g., megawatts) without voltage breakdown, such as by avoiding or reducing the use of dielectrics. The antenna fabricated using additive manufacturing can further be optimized for thermal heat dissipation, with provisions for sealing, with integral feed lines and/or impedance matching features, and/or for scaling from very high frequencies (VHF) to millimeter wave (mmW) while substantially reducing design non-recurring engineering (NRE) costs.

Antenna Structure

FIG. 1 is a side view of an antenna assembly 100, in accordance with an example of the present disclosure. The antenna assembly 100, also referred to as a type of Vivaldi antenna, is a planar, linearly polarized tapered slot antenna. However, it will be understood that two or more of the antenna assemblies 100 can be arranged in an orthogonal pattern for transmitting and receiving multiple polarization directions, such as shown in FIG. 6.

Referring again to FIG. 1, the antenna assembly 100 includes a feed block 102 with an opening 104 and a slot 106 extending from the opening 104 toward a tapered outer edge 108 of a first flare arm 110 and a tapered outer edge 112 of a second flare arm 114. The first flare arm 110 opposes the second flare arm 114 and the tapered outer edges 108 and 112 taper symmetrically outward from the slot 106, forming a gap 120 between the tapered outer edges 108 and 112. The first flare arm 110 and the second flare arm 114 are symmetric about the feed block 102. The first and second flare arms 110 and 114, in combination with the feed block 102, are also referred to as a Vivaldi element.

A feed line 116 is integral with or otherwise structurally unified with the feed block 102 and extends at least partially across the slot 106. The feed line 116 can be integrated into the feed block 102, for example, using additive manufacturing to fabricate the feed block 102 and the feed line 116 as a single contiguous unitary or monolithic structure. For example, the feed line 116 can be fabricated from the same or different materials as the feed block 102 using additive manufacturing where the material(s) are successively added or deposited to form a single contiguous unitary component (as opposed, for instance, to subtractive manufacturing where material is removed from a larger piece to form the component, or to other manufacturing techniques where several components are fabricated separately and subsequently attached, fastened, bonded, coupled, or otherwise joined together). In some examples, the feed line 116 includes a coaxial transmission line, where a portion of the feed line 302 extending across the slot 106 is an unshielded conductor (see FIG. 3 for further detail). The feed line 116 can be connected, for example, to a radio frequency (RF) transmitter and/or an RF receiver 130. In some examples, an interconnect for the feed line 116 can be additively manufactured into the feed block 102 (for instance, as a portion of the unitary or monolithic structure of the feed block 102), providing a low loss signal connection between the feed line 116 and the RF transmitter/receiver 130. In some examples, the slot 106 at the feed block 102 is tapered, where the taper of the feed block 102 is continuous with the tapered outer edges 108 and 112 of the first and second flare arms 110 and 114. For example, the width of slot 106 at the feed block 102 can be greater where the slot 106 adjoins the tapered outer edges 108 and 112 than where the slot 106 adjoins the opening 104 of the feed block 102.

The feed block 102 can include a naturally non-conductive material, with a conductor on the feed block to electrically couple the flare arms 110 and 114, or the feed block 102 can include an electrically conductive material, such as metal or another conductive material. The first flare arm 110 is electrically shorted to the second flare arm 114 via the feed block 102 and/or the conductor on the feed block 102, which effectively acts as a parallel inductor between the first and second flare arms 110 and 114. A combination of the feed block 102, the first flare arm 110, and the second flare arm 114 provide a ground plane 118 of the antenna assembly 100. The ground plane 118 can be excited by a radio frequency current passing through the portion 302 of the feed line 116 extending across the slot 106 (see FIG. 3 for further detail), which causes electromagnetic radiation (EMR) to radiate from the antenna assembly 100. The antenna assembly 100 has an ultra-wideband (UWB) frequency, which is a function of the width of the slot (upper frequency) and the size of the opening 104 (lower frequency). The shapes and sizes of the opening 104, the slot 106, the feed block 102, and the first and second flare arms 110, 114 determine the radiation pattern and frequency coverage of the antenna assembly 100.

Figure 2:
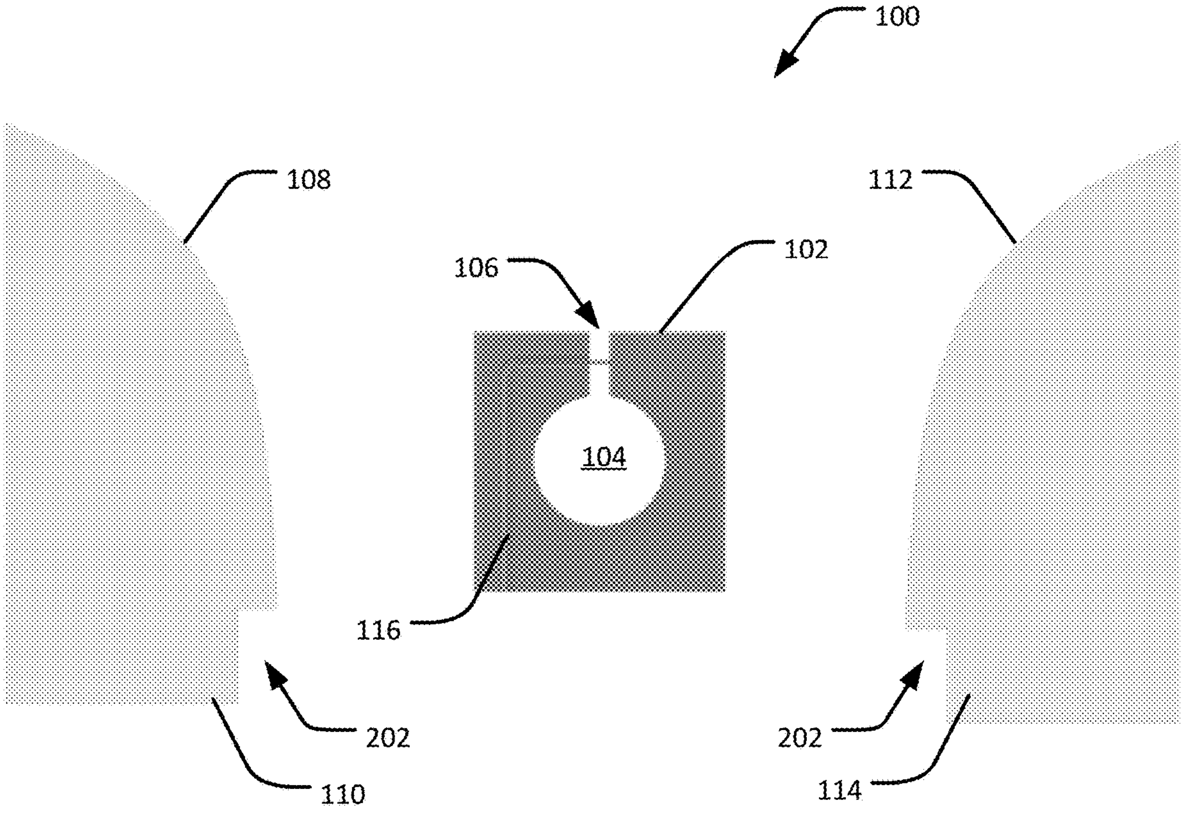
FIG. 2 is an exploded side view of the antenna assembly of FIG. 1, in accordance with an example of the present disclosure.
Figure 9:
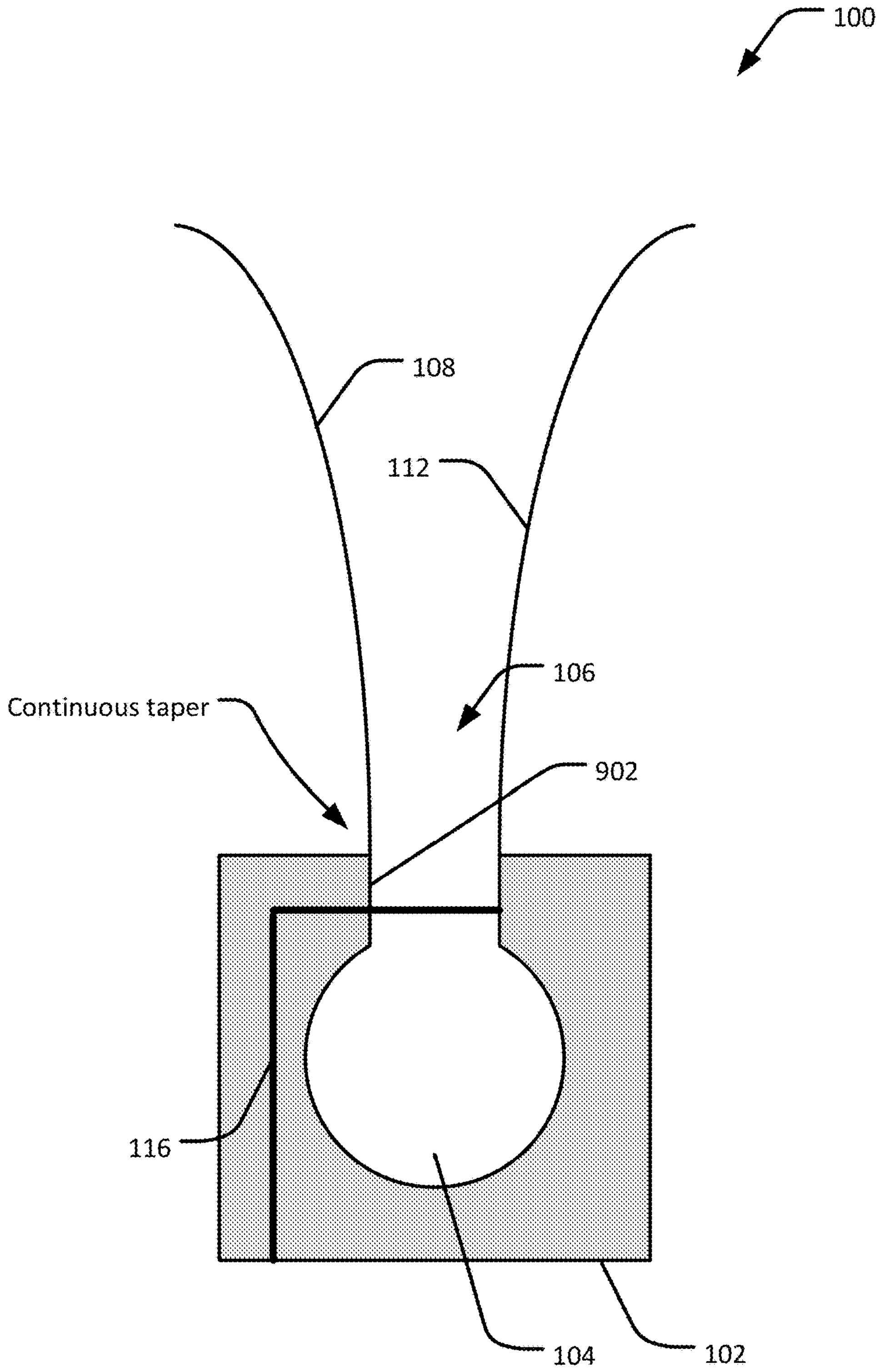
FIG. 9 is a side view of a portion of an antenna with a feed block and a Vivaldi element, in accordance with an example of the present disclosure.

FIG. 2 is an exploded side view of the antenna assembly 100 of FIG. 1, in accordance with an example of the present disclosure. For clarity, the components of the antenna assembly 100 are not drawn to scale in FIG. 2. In some examples, the first flare arm 110, the second flare arm 114, and the feed block 102 can be formed as separate components that are connected together. The first flare arm 110 and the second flare arm 114 each have a cutout region 202 configured to connect with the feed block 102, such as shown in FIG. 1. As noted above, the feed line 116 is integral with or otherwise structurally unified with the feed block 102. The feed line 116 can be integrated into the feed block 102, for example, using additive manufacturing to fabricate the feed block 102 and the feed line 116 as a single contiguous unitary or monolithic structure of material or materials. Such a monolithic three-dimensional structure can be formed by depositing a quantity of material upon existing structures and provides smooth impedance tapers in any direction, to great benefit of antenna performance. For example, each quantity of material, also referred to as a structural pixel, can be located on the structure at a unique coordinate within a spherical coordinate system that can be expanded upon in any direction, as opposed to a layer-by-layer Cartesian construction or a subtractive process of material removal. The disclosed additive manufacturing process allows the antenna to incorporate intentional supports, modest bridges or overhang structures, intrinsic tunnels, intentional pockets, and high aspect ratio features. For example, the first and second flare arms 110 and 114 can each have a continuous impedance taper away from the feed block 102. Fabricating the antenna assembly 100 using additive manufacturing thus enables smooth linear, exponential, and Klopfenstein tapers that are not possible to achieve using subtractive manufacturing due to the overhang geometry or limitations on drilling access. In some examples, such as shown in FIG. 9, the antenna assembly 100 can have a tapered (variable-width) slot 106 at the feed block 102 and/or a tapered (variable-width) feed line 116 for implementing coaxial impedance matching circuits. For example, the taper 902 of the feed block 102 at the slot 106 is continuous with the tapered outer edges 108 and 112.

Although additive manufacturing forms a unitary structure by depositing materials layer by layer, in some examples the feed block 102 and the integral feed line 116 can comprise different materials that are deposited during fabrication. For example, the feed line 116 can include a metallic shield surrounding an electrically insulating layer of material, which at least partially surrounds an electrically conductive layer of material, to provide a coaxial transmission line that is a structurally continuous body of material, a structurally continuous arrangement of materials, or a structurally continuous combination of materials. As used herein, the phrase "structurally continuous" includes bodies, arrangements, or combinations of materials that are additively manufactured to form a single contiguous unitary structure or component.

In some examples, the first flare arm 110, the second flare arm 114, and/or the feed block 102, including the feed line 116, can be additively manufactured into a single contiguous piece of material or into separate pieces of material that can be electrically coupled together. Examples of such an additive manufacturing process include where one or more components of the antenna assembly 100 (e.g., the feed block 102, the first flare arm 110, the second flare arm 114, and/or the feed line 116) are fabricated by the successive addition of material (e.g., via a three-dimensional printing, layering, or other deposition process). The additively manufactured feed block 102 can, for example, include an additively manufactured solid piece of sheet metal, an additively manufactured printed circuit board (PCB), or an additively manufactured dielectric plate that is metalized on one or both sides. For example, the antenna 100, or portions thereof, can be fabricated entirely of metal or any suitable conductive material. In another example, the antenna 100, or portions thereof, can be fabricated any suitable additive or subtractive manufacturing process, including three-dimensional printing, casting, computer numerical control (CNC), or material deposition.

In some examples, the antenna 100, or portions thereof, can be fabricated as a single contiguous unit or structure. In some other examples, individual components of the antenna 100 can be fabricated separately and assembled together. In some examples, the antenna 100, or portions thereof, can be fabricated from any suitable material which may be enclosed in, coated with, or otherwise covered with a conductive material, such as a conductive metal, to provide an electrically conductive metal surface. In some examples, at least portions of the antenna 100 can be fabricated using a thermally conductive material (e.g., a solid, a liquid, and/or a gas), and/or in configurations that provide high thermal conductive properties (e.g., a heat sink, cooling fins, air or liquid cooling channels, heat pipes, etc.). In some examples, the antenna 100 can include plastic or other non-conductive materials that provide a support structure for mounting or otherwise attaching conductive materials.

Figure 3:
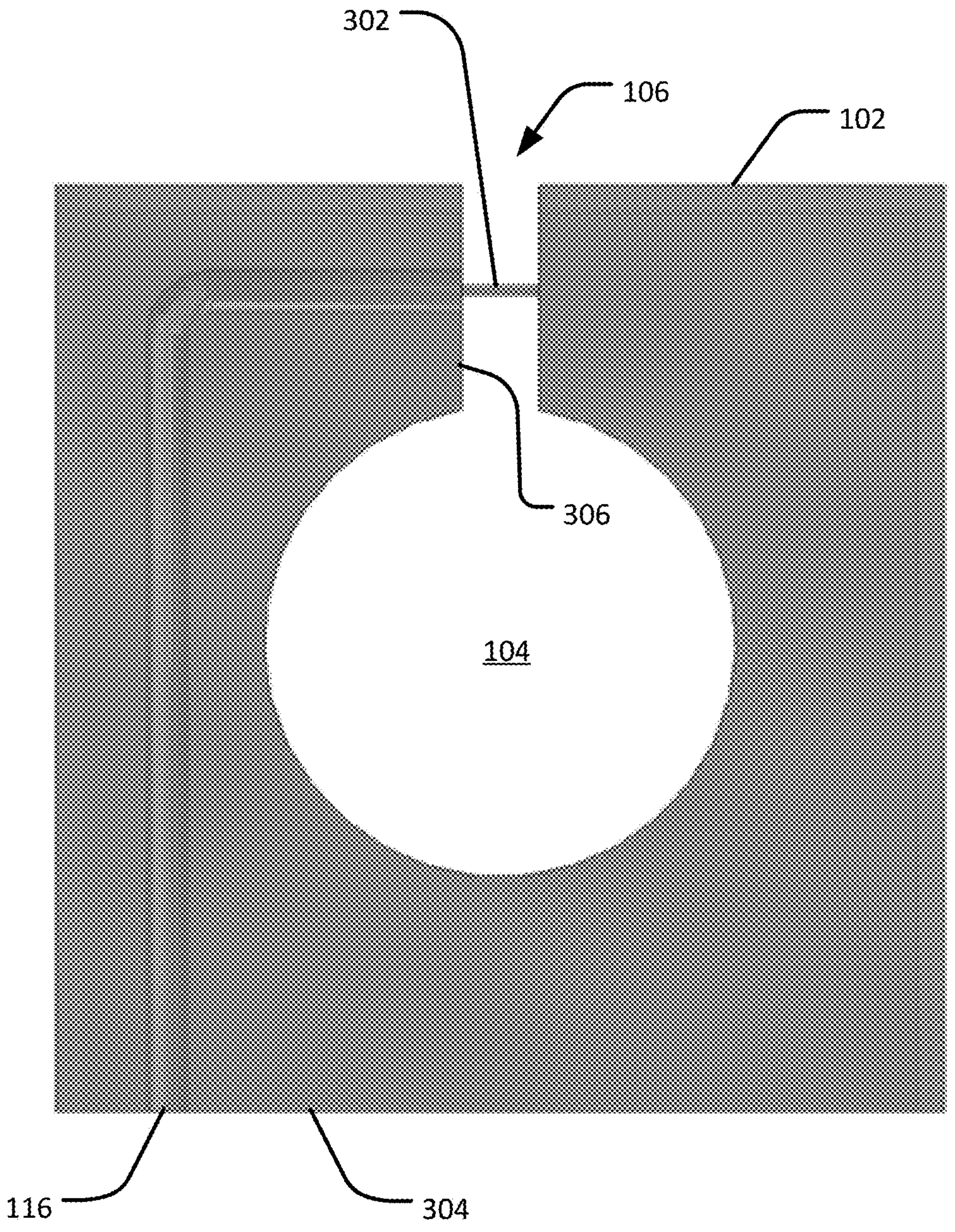
FIG. 3 is a side view of the feed block of the antenna assembly of FIG. 1, in accordance with an example of the present disclosure.

FIG. 3 is a side view of the feed block 102 of the antenna assembly 100 of FIG. 1, in accordance with an example of the present disclosure. As noted above, the feed line 116 is integral with the feed block 102 as a contiguous unitary component. A portion of the feed line 116 extends at least partially across the slot 106. The feed line 116 can be integrated into the feed block 102, for example, using additive manufacturing to fabricate the feed block 102 and the feed line 116 as a single contiguous unitary or monolithic structure. In some examples, the feed line 116 includes a coaxial transmission line, where a portion 302 of the feed line 116 extending across the slot 106 is an unshielded conductor electrically coupled to the coaxial transmission line. The feed line 116 can, for example, be located on or between outer surfaces of the feed block. In an example, the feed line 116 includes an additively manufactured conductor, an additively manufactured dielectric, and/or an additively manufactured conducting shield, which provide a coaxial transmission line integral with or otherwise structurally unified with the feed block 102 during fabrication. In some such examples, where the feed line 116 includes an additively manufactured integral coaxial transmission line, the coaxial transmission line can be hermetically sealed with a vacuum, an air, or a gas dielectric therein. In some other such examples, a non-hermetic coaxial transmission line can be used. In some other examples, the coaxial transmission line is filled with a solid dielectric therein.

The feed line can extend from a first edge 304 of the feed block 102 toward a second edge 306 of the feed block 102, where the first edge 304 is along an outer edge of the antenna assembly 100, such as shown in FIG. 1, and the second edge 306 is at the slot 106.

Figure 4:
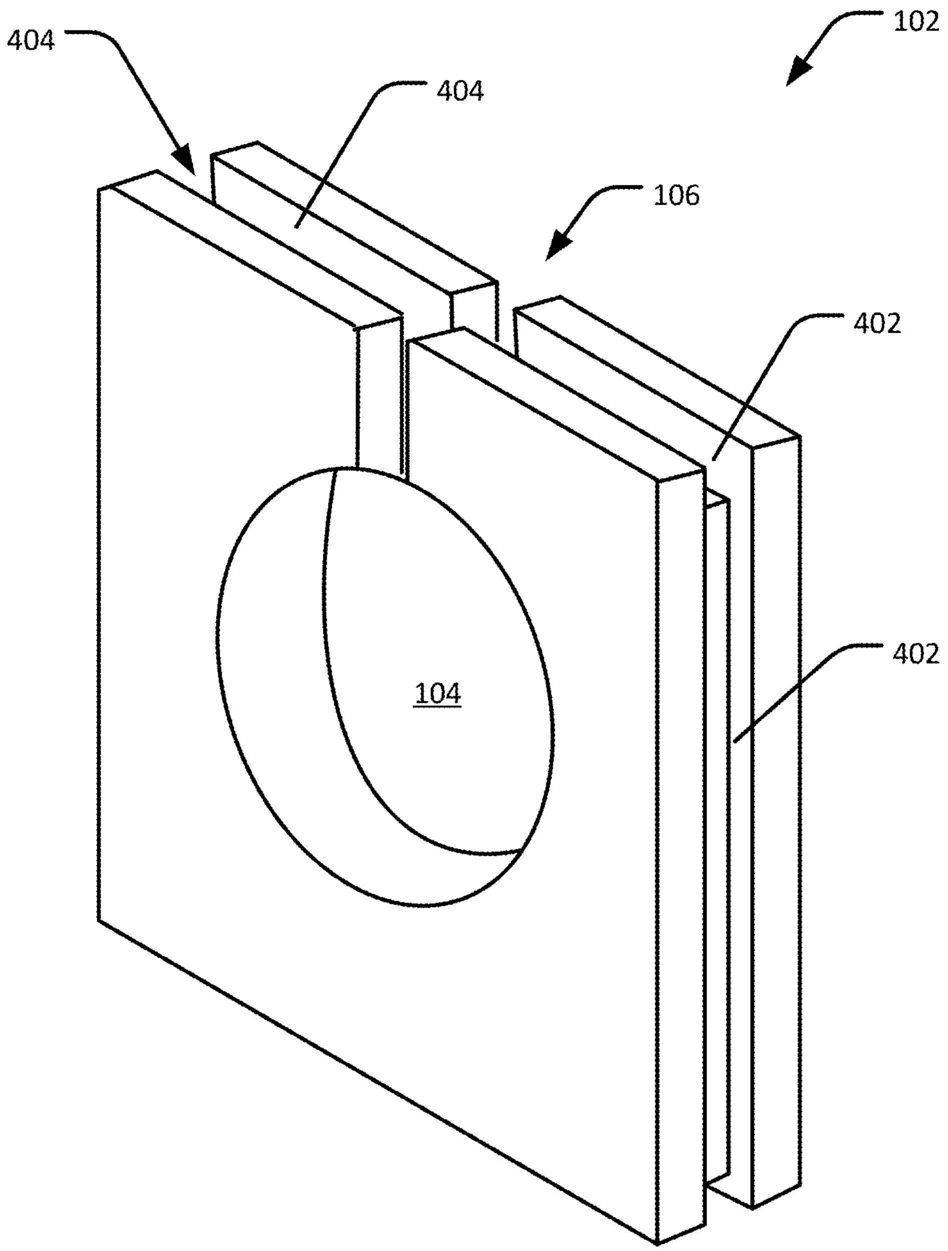
FIG. 4 is a perspective view of the feed block of the antenna assembly of FIG. 1, in accordance with an example of the present disclosure.
Figure 5:
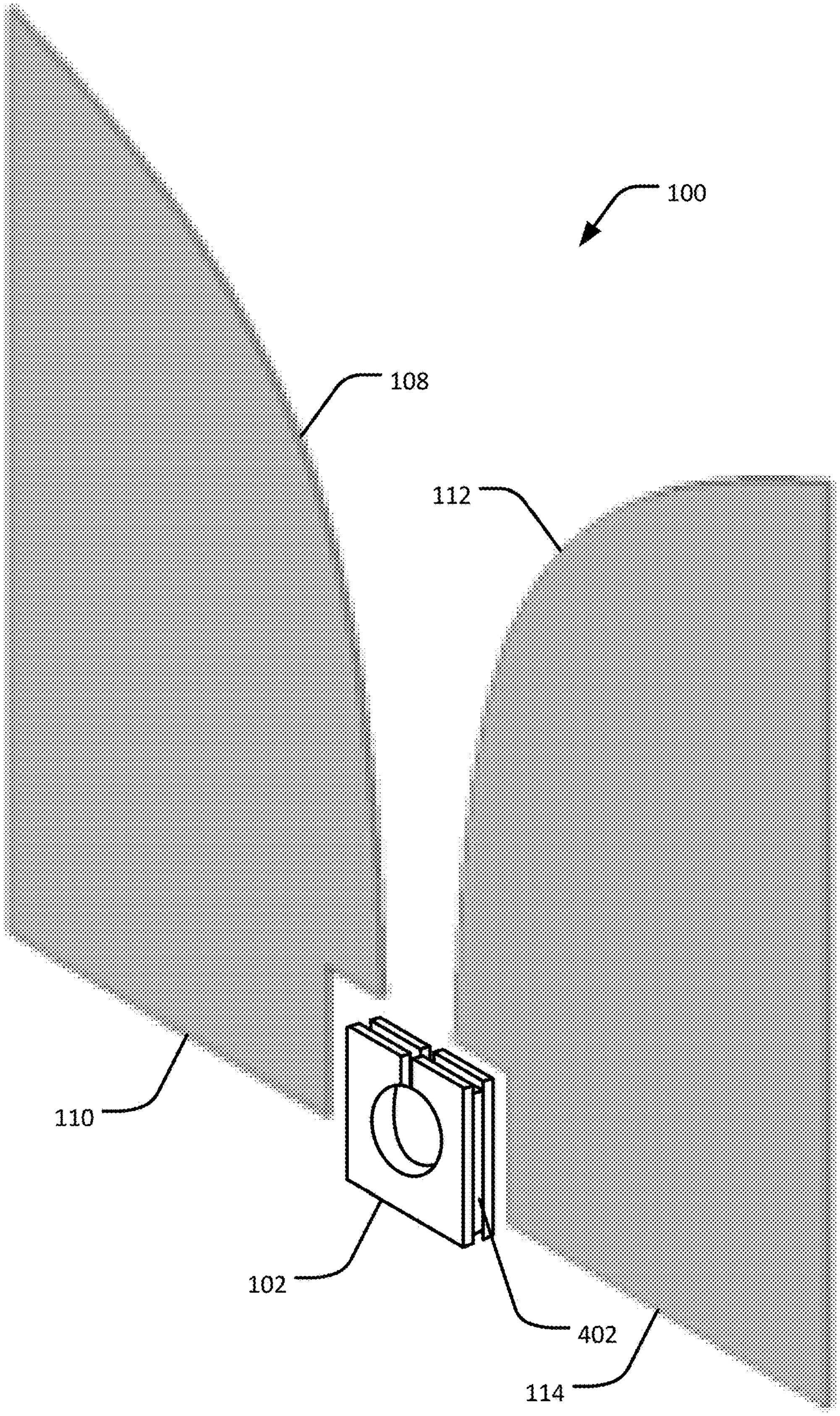
FIG. 5 is an exploded perspective view of the antenna assembly of FIG. 1, in accordance with an example of the present disclosure.

FIG. 4 is a perspective view of the feed block 102 of FIG. 1, and FIG. 5 is an exploded perspective view of the antenna assembly 100 of FIG. 1, in accordance with an example of the present disclosure. In this example, the feed block 102 includes at least one channel 402 around at least a portion of the periphery. The channel 402 is configured to receive an edge of the first flare arm 110 and an edge of the second flare arm 114, where the feed block, the first flare arm and the second flare arm are fabricated as separate components and subsequently connected together at the channel 402. For example, one side of the feed block 102 can have a first channel 404 configured to receive the first flare arm 110 and a second channel 402 configured to receive the second flare arm 114. In another example, the first channel 404, the second channel 402, or both, extend across multiple sides of the feed block 102 (e.g., the left side, the top side, and the right side, as depicted in FIG. 4). The channel 402, 404 can be configured to provide structural rigidity of the antenna assembly 100 and electrical continuity between the first flare arm 110 and the second flare arm 114, once assembled.

The relative arrangement of the first and second flare arms 110 and 114 is shown in FIG. 5. For example, the first flare arm 110 can be connected to the channel 402 on one side of the feed block 102, and the second flare arm 114 can be connected to the channel 402 on the opposite side of the feed block 102. In such examples, a width of the channel 402 is approximately the same as a thickness of the first flare arm 110 and the second flare arm 114 such that the first and second flare arms 110 and 114 securely fit into the channel 402.

The connecting of the first flare arm 110 and the second flare arm 114 to the feed block 102 causes the first flare arm 110 to be electrically shorted to the second flare arm 114 via at least a portion the feed block (e.g., where the feed block 102 includes an electrically conductive material, such as sheet metal, a PCB, or a dielectric plate that is metalized on one or both sides), to form the ground plane 118 of the antenna assembly 100.

Figure 6A:
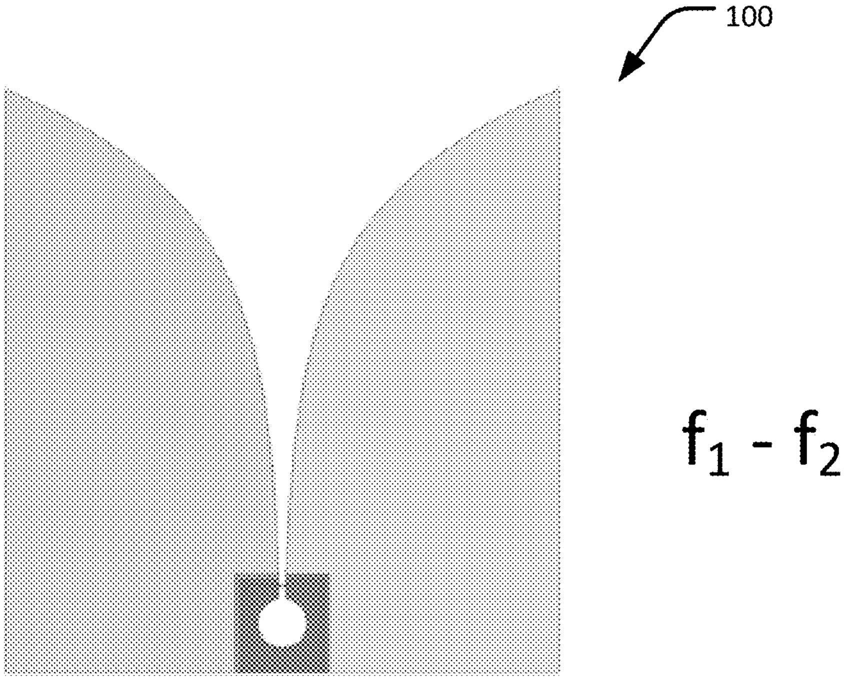
FIGS. 6A-B show the antenna assembly of FIG. 1 fabricated at various scales, in accordance with examples of the present disclosure.
Figure 6B:
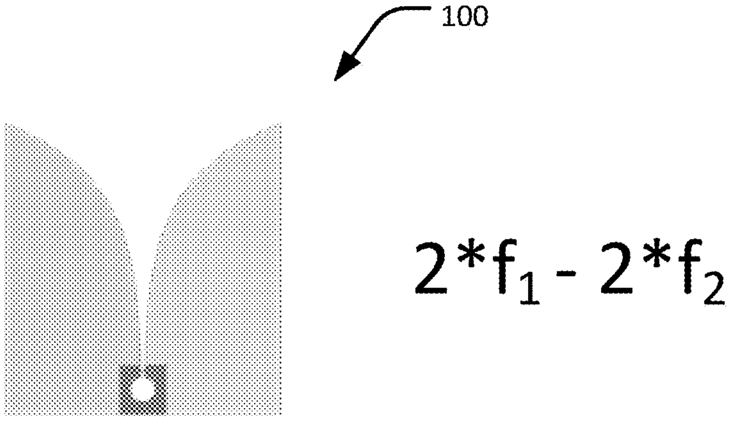

FIGS. 6A-B show the antenna assembly 100 of FIG. 1 fabricated at various scales, in accordance with examples of the present disclosure. As noted above, the antenna design can be wavelength scaled. For example, the antenna assembly 100 can be scaled linearly as a function of frequency. FIG. 6A shows the antenna assembly 100 at a first scale of frequency $f_1$-$f_2$. FIG. 6B shows the antenna assembly 100 at a second scale of frequency $2*f_1-2*f_2$ (e.g., half-scale). It will be appreciated that by using additive manufacturing techniques, the antenna assembly 100 can easily be fabricated at any scale (e.g., quarter-scale, one-tenth scale, etc.) without the need for additional modifications to the manufacturing tooling and assembly process. For example, other types of manufacturing processes, such as metal extrusion, injection molding, laser sintering, CNC machining, and so forth, require specialized product and production designs that are tailored for a given product specification. By contrast, additive manufacturing processes can be easily adapted to meet product specifications with a high degree of accuracy and complexity, as well as providing the ability to consolidate multiple parts into a monolithic or unitary structure or component, which reduces or eliminates cost and material waste while fabricating the final product.

Figure 7:
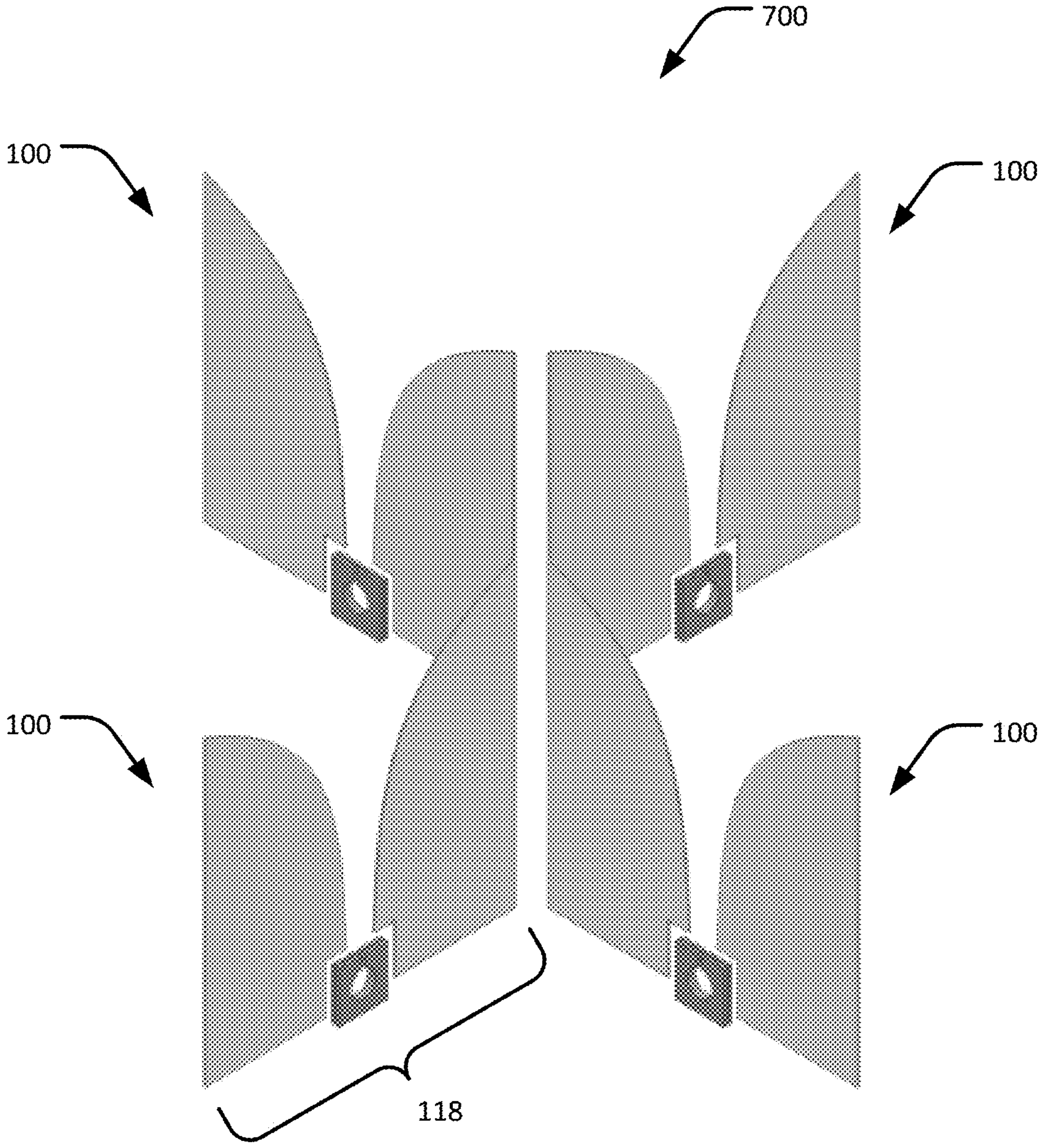
FIG. 7 is a perspective view of an array of antenna assemblies of FIG. 1, in accordance with an example of the present disclosure.

FIG. 7 is a perspective view of an array 700 of antenna assemblies 100 of FIG. 1, in accordance with an example of the present disclosure. In some examples, multiple antenna assemblies 100 can be combined into the antenna array 700, which can be coupled to a single RF transmitter/receiver. For example, multiple antenna assemblies 100 can be additively manufactured as a contiguous unitary or monolithic component with a common ground plane. In some examples, the ground plane 118 of one of the antenna assemblies 100 in the array can be parallel or perpendicular to another one of the antenna assemblies 100, such as shown in FIG. 7, to provide multiple polarization.

Antenna Fabrication Methodology

Figure 8:
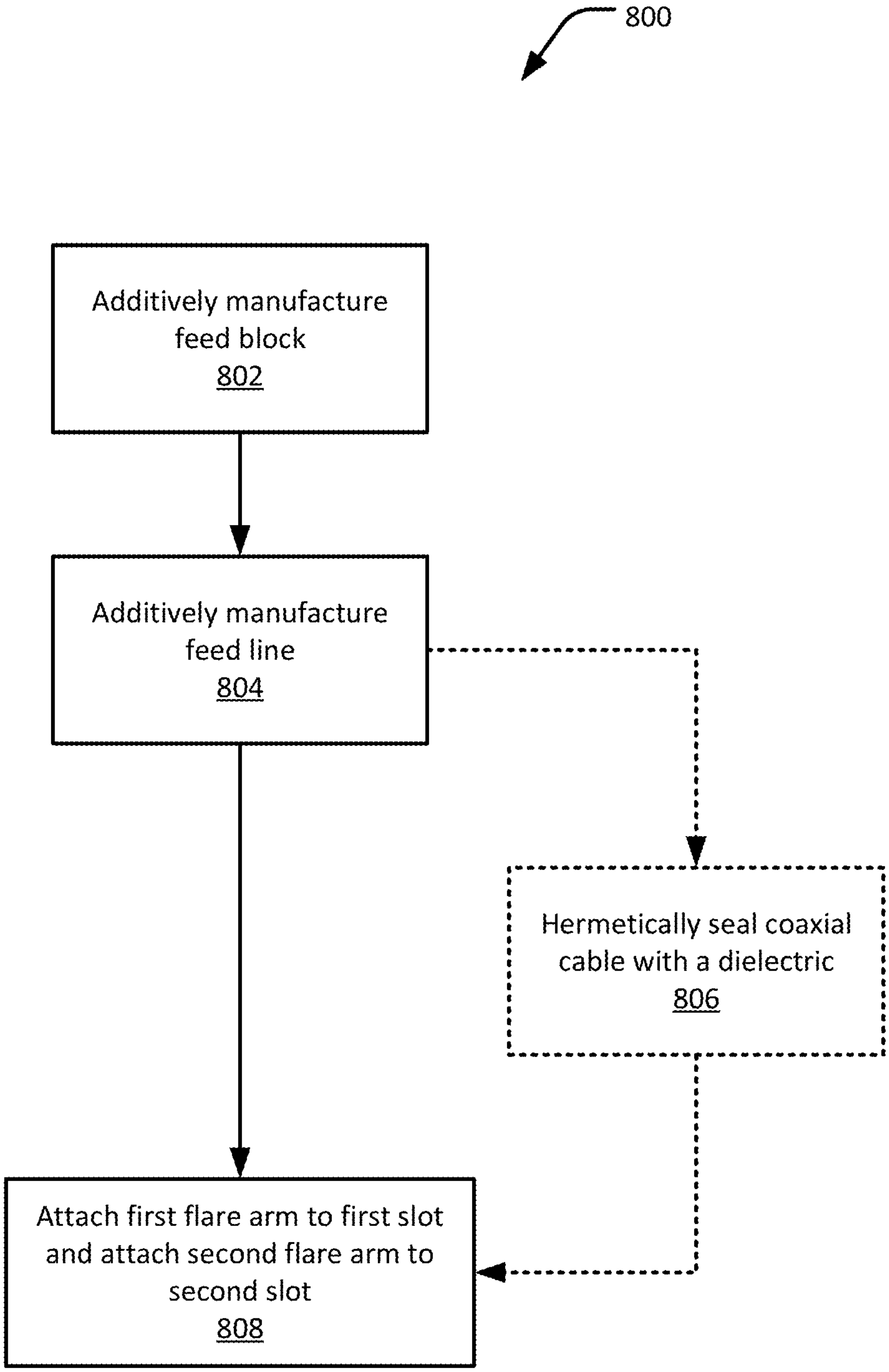
FIG. 8 is a flow diagram of a method of fabricating an antenna assembly, in accordance with an example of the present disclosure.

FIG. 8 is a flow diagram of a method 800 of fabricating an antenna assembly, in accordance with an example of the present disclosure. The antenna assembly fabricated by the method 800 can include, for example, the antenna assembly 100 of FIGS. 1-7 or portions thereof. The method 800 includes additively manufacturing 802 a feed block having an opening therein and a feed slot extending from the opening to an outer periphery of the feed block, where the feed slot is adjacent to a first flare arm and a second flare arm. For example, the feed block 102 can be fabricated using a printing or other deposition technique to form the opening 104 and slot 106, and, in some examples, the channel 402 and/or 404 on the side(s) of the feed block 102 for receiving the first and second flare arms 110 and 114.

The method 800 further includes additively manufacturing 804 a feed line having a first portion integral with or otherwise structurally unified with the feed block as a contiguous unitary component, and a second portion at least partially extending across the feed slot. For example, the first portion of the feed line can include a coaxial transmission line, and the second portion of the feed line can include an unshielded conductor electrically coupled to the coaxial transmission line for exciting the antenna.

In some examples, a material of the feed block includes an additively manufactured solid piece of sheet metal, an additively manufactured printed circuit board (PCB), an additively manufactured dielectric plate that is metalized on one or both sides, or a combination of two or more of the sheet metal, PCB, and dielectric plate. In some examples, the feed line includes an additively manufactured conductor, an additively manufactured dielectric, and an additively manufactured conducting shield. In some examples, the first flare arm includes a first tapered edge, the second flare arm includes a second tapered edge, and the first tapered edge is adjacent and opposed to the second tapered edge, such as shown in FIG. 1. In some such examples, the first tapered edge and the second tapered edge are separated by a gap, and the first tapered edge and the second tapered edge are symmetric with respect to an axis extending through the feed slot.

In some examples, the method 800 further includes hermetically sealing 806 the coaxial transmission line with a vacuum, an air, or a gas dielectric therein, or filled with a solid dielectric therein. In some other examples, the coaxial transmission line is not hermetically sealed.

In some examples, the feed block includes a first channel configured to receive a portion of the first flare arm and a second channel configured to receive a portion of the second flare arm, such as shown in FIGS. 4 and 5. In such examples, the method 800 further includes attaching 808 the first flare arm to the first channel and attaching the second flare arm to the second channel.

Further Examples

The following examples pertain to further examples, from which numerous permutations and configurations will be apparent.

Example 1 provides an antenna assembly comprising a first flare arm having a first tapered edge; a second flare arm having a second tapered edge located adjacent to the first flare arm; a feed block having an opening therein; a feed slot extending from the opening to an outer periphery of the feed block; and a feed line having a first portion integral with the feed block as a contiguous unitary component, and a second portion at least partially extending across the feed slot, wherein the feed slot is continuously tapered with respect to at least one of the first tapered edge and the second tapered edge.

Example 2 includes the subject matter of Example 1, wherein the first portion of the feed line includes a coaxial transmission line, and wherein the second portion of the feed line includes an unshielded conductor electrically coupled to the coaxial transmission line.

Example 3 includes the subject matter of Example 2, wherein the coaxial transmission line is hermetically sealed with a vacuum, an air, or a gas dielectric therein.

Example 4 includes the subject matter of Example 2, wherein the coaxial transmission line is filled with a solid dielectric therein.

Example 5 includes the subject matter of any one of Examples 1-4, wherein the feed block includes an additively manufactured material.

Example 6 includes the subject matter of any one of Examples 1-5, further comprising a conductor on the feed block.

Example 7 includes the subject matter of any one of Examples 1-6, wherein the feed line includes an additively manufactured conductor, an additively manufactured dielectric, and an additively manufactured conducting shield.

Example 8 includes the subject matter of any one of Examples 1-7, wherein the first tapered edge is adjacent and opposed to the second tapered edge, and the first flare arm and the second flare arm are symmetric about the feed block.

Example 9 includes the subject matter of Example 8, wherein the first tapered edge and the second tapered edge are separated by a gap.

Example 10 includes the subject matter of Example 8, wherein the first tapered edge and the second tapered edge are symmetric with respect to an axis extending through the feed slot.

Example 11 includes the subject matter of any one of Examples 1-10, wherein the feed block includes a first channel configured to receive a portion of the first flare arm and a second channel configured to receive a portion of the second flare arm.

Example 12 provides a method of fabricating an antenna assembly, the method comprising additively manufacturing a feed block having an opening therein and a tapered feed slot extending from the opening to an outer periphery of the feed block, the tapered feed slot being adjacent to a first flare arm and a second flare arm; and additively manufacturing a feed line having a first portion integral with the feed block as a contiguous unitary component, and a second portion at least partially extending across the feed slot, wherein the tapered feed slot is continuously tapered with respect to at least one of the first flare arm and the second flare arm.

Example 13 includes the subject matter of Example 12, wherein the first portion of the feed line includes a coaxial transmission line, and wherein the second portion of the feed line includes an unshielded conductor electrically coupled to the coaxial transmission line.

Example 14 includes the subject matter of Example 13, further comprising hermetically sealing the coaxial transmission line with a vacuum, an air, or a gas dielectric therein.

Example 15 includes the subject matter of Example 13, further comprising filling the coaxial transmission line with a solid dielectric therein.

Example 16 includes the subject matter of any one of Examples 12-15, further comprising attaching a conductor to the feed block.

Example 17 includes the subject matter of any one of Examples 12-16, wherein the feed line includes an additively manufactured conductor, an additively manufactured dielectric, and an additively manufactured conducting shield.

Example 18 includes the subject matter of any one of Examples 12-17, wherein the first flare arm includes a first tapered edge, wherein the second flare arm includes a second tapered edge, and wherein the first tapered edge is adjacent and opposed to the second tapered edge, and the first flare arm and the second flare arm are symmetric about the feed block.

Example 19 includes the subject matter of Example 18, wherein the first tapered edge and the second tapered edge are separated by a gap, and wherein the first tapered edge and the second tapered edge are symmetric with respect to an axis extending through the feed slot.

Example 20 includes the subject matter of any one of Examples 12-19, wherein the feed block includes a first channel configured to receive a portion of the first flare arm and a second channel configured to receive a portion of the second flare arm, and wherein the method further comprises attaching the first flare arm to the first channel and attaching the second flare arm to the second channel.

Example 21 provides an antenna array assembly comprising a plurality of antenna assemblies arranged in an array, where each of the antenna assemblies including a first flare arm; a second flare arm located adjacent to the first flare arm; a feed block having an opening therein; a feed slot extending from the opening to an outer periphery of the feed block; and a feed line having a first portion integral with the feed block as a contiguous unitary component, and a second portion at least partially extending across the feed slot.

Example 22 includes the subject matter of Example 21, wherein each of the antenna assemblies are integral with each other so as to form a contiguous unitary component.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the modular antenna.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna assembly comprising:

a first flare arm having a first tapered edge;

a second flare arm having a second tapered edge located adjacent to the first flare arm;

a feed block having an opening therein;

a feed slot extending from the opening to an outer periphery of the feed block; and a feed line having a first portion integral with the feed block as a contiguous unitary component, and a second portion at least partially extending across the feed slot, wherein the feed slot is continuously tapered with respect to at least one of the first tapered edge and the second tapered edge; and wherein the feed block includes a first channel configured to receive a portion of the first flare arm and a second channel configured to receive a portion of the second flare arm.

2. The antenna assembly of claim 1, wherein the first portion of the feed line includes a coaxial transmission line, and wherein the second portion of the feed line includes an unshielded conductor electrically coupled to the coaxial transmission line.

3. The antenna assembly of claim 2, wherein the coaxial transmission line is hermetically sealed with a vacuum, an air, or a gas dielectric therein.

4. The antenna assembly of claim 2, wherein the coaxial transmission line is filled with a solid dielectric therein.

5. The antenna assembly of claim 1, wherein the feed block includes an additively manufactured material.

6. The antenna assembly of claim 5, further comprising a conductor on the feed block.

7. The antenna assembly of claim 1, wherein the feed line includes an additively manufactured conductor, an additively manufactured dielectric, and an additively manufactured conducting shield.

8. The antenna assembly of claim 1, wherein the first tapered edge is adjacent and opposed to the second tapered edge, and the first flare arm and the second flare arm are symmetric about the feed block.

9. The antenna assembly of claim 8, wherein the first tapered edge and the second tapered edge are separated by a gap.

10. The antenna assembly of claim 8, wherein the first tapered edge and the second tapered edge are symmetric with respect to an axis extending through the feed slot.

11. A method of fabricating an antenna assembly, the method comprising:

additively manufacturing a feed block having an opening therein and a tapered feed slot extending from the opening to an outer periphery of the feed block, the tapered feed slot being adjacent to a first flare arm and a second flare arm; and additively manufacturing a feed line having a first portion integral with the feed block as a contiguous unitary component, and a second portion at least partially extending across the tapered feed slot, wherein the tapered feed slot is continuously tapered with respect to at least one of the first flare arm and the second flare arm; and wherein the feed block includes a first channel configured to receive a portion of the first flare arm and a second channel configured to receive a portion of the second flare arm.

12. The method of claim 11, wherein the first portion of the feed line includes a coaxial transmission line, and wherein the second portion of the feed line includes an unshielded conductor electrically coupled to the coaxial transmission line.

13. The method of claim 12, further comprising hermetically sealing the coaxial transmission line with a vacuum, an air, or a gas dielectric therein.

14. The method of claim 12, further comprising filling the coaxial transmission line with a solid dielectric therein.

15. The method of claim 11, further comprising attaching a conductor to the feed block.

16. The method of claim 11, wherein the feed line includes an additively manufactured conductor, an additively manufactured dielectric, and an additively manufactured conducting shield.

17. The method of claim 11, wherein the first flare arm includes a first tapered edge, wherein the second flare arm includes a second tapered edge, and wherein the first tapered edge is adjacent and opposed to the second tapered edge, and the first flare arm and the second flare arm are symmetric about the feed block.

18. An antenna array assembly comprising:

a plurality of antenna assemblies arranged in an array, each of the antenna assemblies including a first flare arm;

a second flare arm located adjacent to the first flare arm;

a feed block having an opening therein;

a feed slot extending from the opening to an outer periphery of the feed block; and a feed line having a first portion integral with the feed block as a contiguous unitary component, and a second portion at least partially extending across the feed slot;

wherein the feed block includes a first channel configured to receive a portion of the first flare arm and a second channel configured to receive a portion of the second flare arm.

19. The antenna array assembly of claim 18, wherein each of the antenna assemblies are integral with each other so as to form a contiguous unitary component.

* * * * *